United States Patent [19]

Alm

[11] Patent Number: 4,719,350
[45] Date of Patent: Jan. 12, 1988

[54] RADIATION IMAGING ENHANCEMENT

[75] Inventor: Ake W. Alm, Rancho Palos Verdes, Calif.

[73] Assignee: Hughes Aircraft Co., Los Angeles, Calif.

[21] Appl. No.: 824,381

[22] Filed: Jan. 30, 1986

[51] Int. Cl.⁴ .................... G02F 1/01; H01L 25/00; G02B 26/10
[52] U.S. Cl. .................... 250/330; 250/332; 250/334
[58] Field of Search .................... 250/330, 332, 334; 358/113

[56] References Cited

U.S. PATENT DOCUMENTS

| | | | |
|---|---|---|---|
| 4,225,883 | 9/1980 | Van Atta et al. | 250/334 |
| 4,362,938 | 12/1982 | Bosserman | 250/334 |
| 4,403,148 | 9/1983 | Coon et al. | 250/334 |

*Primary Examiner*—Janice A. Howell
*Attorney, Agent, or Firm*—Ronald L. Taylor; A. W. Karambelas

[57] ABSTRACT

An imaging system incorporating a scanned array of infrared detectors for a presentation of scene data on a display includes gain normalization circuitry coupled to individual ones of the detectors of the detector array. The normalization circuitry is structured as a feedback loop introducing equality between the magnitude of an average value of a detector signal and a reference signal. The imaging system comprises a set of channels connecting with respective ones of the detectors, each channel having adaptive gain control circuitry. A common value of the reference signal is applied to each channel for uniformity in a displayed image. The averaging time is several times greater than the duration of a single scan in the scanning of the detector array so that the display is relatively free of nonuniformities associated with differing responsivities of the detectors to infrared radiation. A nonlinear gain function is produced by connection of multipliers and/or logarithmic circuitry in a forward branch of the loop. A feed forward branch includes a filter coupled to the multipliers for adaptive accentuation of higher frequencies of the signal spectrum to enhance subject edge lines.

19 Claims, 16 Drawing Figures

RADIATION IMAGING ENHANCEMENT

BACKGROUND OF THE INVENTION

This invention relates to radiation imaging systems and, more particularly, to an imaging system employing a radiation scanner with an array of infrared detectors in combination with averaging and adaptive signal compression circuitry for improved uniformity and clarity in reproduction of scenes to be imaged by the system.

One well known form of infrared imaging system employs an array of infrared detectors and a lens for directing rays of radiation from a portion of a scene being viewed to the array of detectors. Typically, the detectors are arranged along a line and are scanned in a direction perpendicular to the line, the line of detectors providing the width of a swath being swept during a single line of scan.

In one application of considerable interest, the scene being imaged is viewed on a display wherein the scan lines are parallel to a horizontal axis of the display while the line of detectors is parallel to a vertical axis of the display. Typical subject matter of the foregoing scene would include both sky and land. As viewed by infrared detectors, the sky presents subject matter which is of a lower temperature than the subject matter presented by land. Also included within the typical scene would be objects of higher temperature, such as aircraft, within the sky, and cooler subject matter such as a lake or river on the land. Buildings, roadways, trees, and other foliage may also be present as further subject matter within the scene.

Subject matter in the foregoing portions of the scene emit infrared radiation at differing temperatures characteristic of the subject matter in response to illumination by the sun, or in response to some other source of heat. Each detector produces an electric signal of varying amplitude dependent upon the temperature of the subject matter of the portion of the scene being viewed by the detector. The signals produced by the array of detectors are processed in individual detector channels and may be applied to a display for presentation of an image of the various objects in the scene being viewed.

A problem arises in that variations in temperature from the coldest subject matter of a scan line to the hottest subject matter of a scan line would produce a temperature differential which exceeds the dynamic range of the display. As a result, in the use of scanning equipment wherein all detector channels are subject to a common gain control, a choice must be made as to which part of the scene is to be presented on the display. If the gain is increased for viewing weak signals from cool subjects, the strong signals from hot subjects may saturate the display and cause streaking. Alternatively, if the gain is reduced, the cool subjects may be lost from the display.

A further problem arises in the operation of such a scanner due to a variation among the detectors in their responsivity to incident infrared radiation. Such variation in responsivity, if uncorrected, introduces a lack of uniformity to the displayed image. Thus, two detectors receiving the same radiation may produce output signals of differing amplitudes. This further compounds the foregoing problem of the dynamic range in that portions of the image scanned by certain ones of the detectors may be overly intense or excessively weak in their presentation on the display. The lack of uniformity degrades the displayed image quality and obscures information in the image.

One solution to the problem of reduced uniformity due to differing detector responsivity has been the use of individual alignment circuits incorporating manually adjustable potentiometers for each of the detectors. The solution is disadvantageous because of a requirement for excessive operator time in the manual adjustment of the potentiometers in a scanner of many, possibly in excess of one hundred, detectors in the detector array.

In the construction of the typical scanner, all of the detectors are placed within a single chamber which is maintained by cooling equipment at a low temperature. When replacement of a number of the detectors is required, the entire array is replaced in which case all of the potentiometers must be reset manually for alignment of the scanner.

A further solution to the uniformity problem has been the scaling of all signals presented to the display as by use of automatic gain control employing the injection of a pilot signal into the field of view of each of the detectors. Such operation involves unwanted complexity such as additional optics for injection of an infrared pilot signal.

The foregoing attempts to solve the uniformity problem do not treat the foregoing limitation on the dynamic range of signals which can be displayed.

Yet another problem arises in the use of infrared scanning for producing a scene image, this problem being a blurring of edge lines of subject matter by components of the scanner optical system. Such blurring may be considered as the convolution of the scene image with a blurring function resulting in a loss of definition at the high-frequency portion of the spectrum of each scanned detector signal. Data in the middle and the low frequency portions of the spectrum are not significantly affected by such blurring.

SUMMARY OF THE INVENTION

The foregoing problems are overcome and other advantages are provided by a radiation scanner incorporating a uniformity correction system of the invention. The correction system accomplishes a major object of the invention, namely, the enlargement of dynamic range in the display of a scene having both a large cool area and a large warm area, while simultaneously improving the uniformity of the display. This is accomplished by averaging signals in individual ones of the detector channels so as to establish values of channel gain which are tailored to the image swaths of each line scan.

In addition, the invention includes a deconvolution filter in each detector channel for boosting or accentuating the high frequency response and thereby restoring clarity to edge lines of the various subjects in the scene image. The deconvolution filter is included within an adaptive circuit which scales the amount of high-frequency boost in accordance with signal strength, thereby to avoid excessive amplification of noise in a weak signal situation. The adaptive circuit has a nonlinear (square root) gain-control characteristic which further enlarges the dynamic range of signals which can be imaged.

The scanner is constructed of an array of detectors of which the radiation receiving pattern is scanned across a scene containing an object to be viewed by the scanner. In accordance with the operation of the invention, the uniformity correction system includes electric circuitry for averaging detector signals from individual ones of the detectors over the duration of several or more sweeps of a scan. The detector signals are amplified by gain control amplifiers employing AC (alternative current) coupling which excludes signals resulting from a DC (direct current) or substantially constant background radiation from the scene being scanned. Both long duration and short duration signals are amplified, the long duration signals being produced by radiation from subjects having an extent which is less than that of a scan line, but may occupy a susbstantial portion of the scan line. Such subjects include buildings, roads, plant life, and other large subjects. The short duration signals result from relatively small targets, object details or texture information.

The gain control is dependent on the average value of an AC amplifier signal in each of the respective detector channels. The small targets contribute relatively little energy to the average of a scan line, and accordingly, the gain in each channel is dependent primarily on the contributions of the larger targets, or subject matter, present in the respective detector channels. A common reference signal is applied in the gain control circuits of the respective channels to control the scene average for each detector channel to attain uniformity in the scene image. Adjustment of the gain individually for each channel in accordance with signal strength of the corresponding scanned portions of the scene permits viewing of a larger dynamic range. The theory of operation of the invention applies equally well to scanners of acoustic radiation, as well as to scanners of other regions of the electromagnetic spectrum.

BRIEF DESCRIPTION OF THE DRAWINGS

The foregoing aspects and other features of the invention are explained in the following description taken in connection with the accompanying drawing wherein.

DESCRIPTION OF THE PREFERRED EMBODIMENTS

Figure 1:
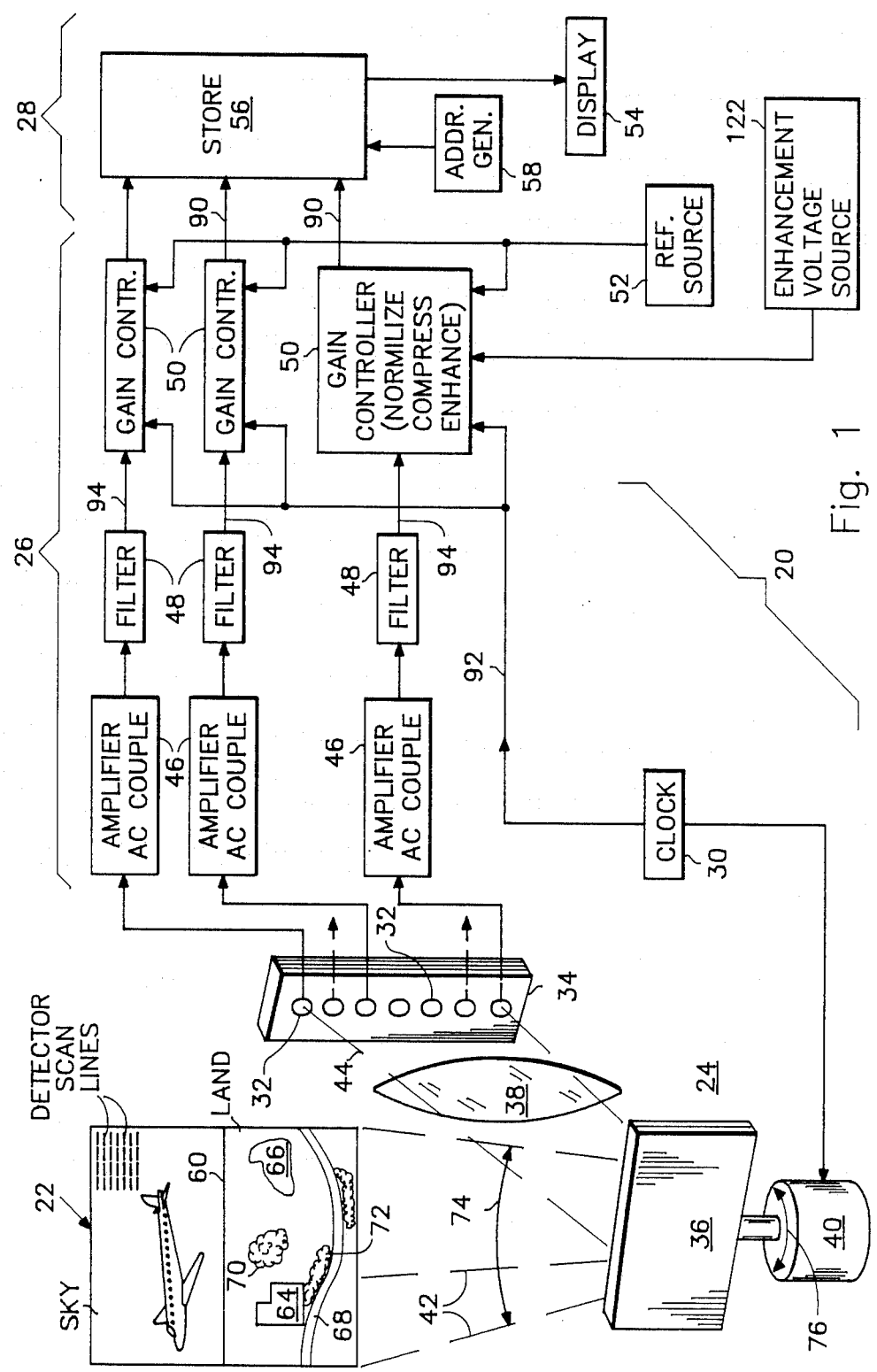
FIG. 1 is a block diagram of an imaging system incorporating a radiation scanner coupled to gain control circuitry of the invention.

FIG. 1 shows a system 20 for forming an image of a scene 22. The system 20 comprises a scanner 24, a signal processor 26 coupled to the scanner 24, a data processor 28 coupled to the signal processor 26, and a clock 30 for synchronizing the operation of the scanner 24 and the signal processor 26. The scanner 24 comprises an array of detectors 32 mounted within a support 34, a mirror 36 and a lens 38 for guiding radiation from the scene 22 to the detectors 32, and a drive unit 40 which pivots the mirror 36 cyclically. Rays 42 of radiation emanating from the scene 22 are reflected by the mirror 36 as rays 44 which propagate through the lens 38 to impinge upon the array of the detectors 32. The lens 38 focuses a region of the scene 22 upon the array of detectors 32. The pivoting of the mirror 36 by the drive unit 40 imparts a scanning motion to the rays 42 which sweep out a set of paths or swaths through the scene 22, with each path being associated with one of the detectors 32. The speed of the drive unit 40 is controlled by pulses from the clock 30 to provide a predetermined period to a scan of the rays 42 across the scene 22. For example, the mirror 36 may pivot at a rate of 60 Hz (hertz). The detectors 32 are responsive to the scene radiation incident thereupon for producing a set of output signals which are applied to the signal processor 26.

The signal processor 26 comprises a set of channels corresponding to respective ones of the detectors 32, with each channel including an amplifier 46, a filter 48, and a gain controller 50. Each of the amplifiers 46 receives the output signal of its corresponding detector 32 and amplifies the signal to a suitable level for further signal processing. Each amplifier 46 provides AC coupling of a detector signal to remove the DC component from the background radiation of the scene. The filters 48 are low pass filters having passbands equal to the useful frequency bandwidth of the detector signals and are employed advantageously in accordance with common practice to maximize the ratio of signal-to-noise.

The gain controllers 50 in respective ones of the channels receive the signals outputted by corresponding ones of filters 48 and, as will be described in further detail hereinafter with reference to succeeding figures provide for further amplification of the respective signals with gain normalization based on average values of the respective detector signals. In addition, the gain controllers 50 provide gain compression by use of a logarithmic or, preferably, a square root transfer characteristic. And, in accordance with a further and important feature of the invention, the controllers 50 include an adaptive enhancement circuit with a deconvolution filter (to be described in FIG. 5) which boots high frequency response to clarify edge lines of subject matter in the scene image. Digital averaging circuitry may be employed within each controller 50, the averaging circuitry being driven by clock pulses of the clock 30 to provide an averaging time equal to NT wherein N represents several or more periods of the scanning and T is the duration of a single period. N may have an integral or nonintegral value. The signal processor 26 also includes a source 52 of a reference signal which is applied to each if the gain controllers 50 as will be explained hereinafter with reference to FIG. 2.

The data processor 28 comprises a display 54, a storage unit 56 which stores data to be presented on the display 54, and an address generator 58 which addresses the storage unit 56 to receive signals from respective ones of the gain controllers 50 and to output signals from the storage unit 56 to the display 54. The storage unit 56, the address generator 58 and the display 54 are operated in response to timing signals, not shown in the drawing, which are provided by the clock 30 or other suitable source of timing signals. The signals outputted from the gain controllers 50 in the respective channels of the signal processor 26 correspond to data points of the scene 22, these points being presented as pixels on the display 54. Thereby, the imaging system 20 presents an image of the scene 22 upon the face of the display 54.

In operation, the system 20 is adapted for the scanning of radiation emitted by subject matter of the scene 22 in the infrared portion of the electromagnetic spectrum. The principles of the invention also apply to other portions of the electromagnetic spectrum, as well as to scanning of fields of sound with acoustic detectors or transducers. However, the invention is most readily explained in terms of infrared imaging and, accordingly, the ensuing description will be directed to infrared imaging.

The scene 22 is provided by way of example to show typical subject matter which may be the subject of infrared imaging, and includes land and sky separated by a horizon 60. The scanner 24 is directed towards the horizon 60 so as to include both sky and land within the scene 22. An aircraft 62 is shown above the horizon 60. A building 64, a lake 66, a road 68, a tree 70, and other foliage 72 are shown on the land. The intensity of infrared radiation emitted by the foregoing components of the scene 22 varies in accordance with the temperatures of the various components of the scene 22. Thus, the sky is relatively cool while the aircraft 62 is relatively warm. Similarly, the lake 66, the tree 70, and the foliage 72 are relatively cool while the building 64 and the road 68 are relatively warm. As a result in the differences of temperatures of the foregoing objects in the scene 22, the intensity of radiation received by any one of the detectors 32 changes as the scanning path associated with an individual detector 32 passes over subject matter of differing temperatures.

The scanner 24 scans in the horizontal direction so as to provide scan lines for each of the detectors 32 which are parallel to the horizon 60. A set of exemplary scan lines for a few of the detectors 32 are shown as dashed lines in a portion of the sky. These scan lines define the paths of subject matter swept out by respective ones of the detectors 32 during a single pass across the scene 22. While only a relatively few detectors 32 are depicted in the drawing, it is to be understood that the line array of the detectors 32 includes a sufficient number of detectors 32 to cover the vertical dimension of the scene 22. Some of these detectors scan the sky while the balance of these detectors scan the land.

The direction of pivoting of the mirror 36 to provide the horizontal scanning is indicated by arcuate arrows 74 and 76. The mirror 36 undergoes oscillatory motion, with each scan being done in one direction, followed by a retrace in the opposite direction to return the mirror 36, to the starting position for the next scan. The retrace time is sufficiently fast, so as to have little effect on the averaging and gain control. Also, the rapid retrace of the image has much high spectral frequency components, most of which may lie outside the pass band of each of the filters 48 so as to have little effect on the averaging. If desired, the drive unit 40 may be provided with a well known tilt mechanism (not shown) for tilting the mirror 36 during alternate sweeping of the scan paths so as to provide an interlaced scan. During each cycle of the scanning, a detector 32 sweeps out the same path of the scene 22. Thus, each detector 32 is associated with the same strip-shaped portion of the scene 22 during a succession of scans.

In accordance with the invention, advantage is taken of the scan pattern wherein each of the detectors 32 repetitively scans the same portion of the scene 22. If the scanner 24 is carried by a moving vehicle, such as an aircraft, the scene 22 changes slowly so that the image of each scan line, or swath of the scene, may be regarded as being quasi periodic. The invention provides for the averaging of signals outputted by a detector 32 over a duration of time equal to several or more cycles of the scanning, for example, 20 cycles of the scanning. The relatively cool background radiation of line scans of the sky and the relatively warm background radiation of line scans of the land are filtered out by the AC coupling. The average signal strength appearing in scan lines of the sky is based on the appearance of relatively small subjects such as aircraft. The average signal strength of line scans of the land is based on the contributions of relatively large subjects such as buildings. Thus, by use of the horizontal orientation of the line scans, the average values of subjects scanned in the sky is obtained independently of the average values of subjects scanned on the land.

Since the average value of the relatively large warm objects and the average value of the relatively cool objects have been forced by the normalizing and averaging function of the gain controllers 50 to be equal to the common reference signal, the signals representing the outline of the aircraft 62 are readily detected against both the sky and the land. Accordingly, the aircraft 62 can be presented on the display 54 without the effects of saturation and streaking associated with excessive dynamic range of detector signals resulting from wide variations in subject temperature. The foregoing operation of the gain control circuitry normalizes each detector channel so that individual variations in detector responsivity to incident radiation have essentially no effect on a displayed image.

It is noted that the orientation of a plane of the scan relative to the horizon is significant with respect to the operation of the system 20. This may be appreciated by considering some other direction of scan, such as direction perpendicular to the horizon 60. In such a case, the detector scan lines would pass through both the cool area of the sky and the warm area of the land. In this case, the average value of a detector signal would be larger than that associated with the sky. The aircraft 62 would still be visible against the average value, but the difference between the signal strength associated with the aircraft 62 and that of the average value would be less than that of the previous case wherein the plane of scan is parallel to the horizon 60. Consequently, it is appreciated that the orientation of a scan plane parallel to the major boundaries of the cool and warm areas of the scene is advantageous for enhancement of the image of objects in a scene presented on the display 54. However, the horizon in the scene appears with greater clarity with the perpendicular scan.

The foregoing operation of the invention may be regarded as the displaying of differential subject intensity, based on difference in temperature rather than the true intensity of signals emanating from various subject matter in the scene 22. The average value of a detector signal, which value serves as a reference tone for the center of a gray scale on the display 54 and as a reference for detecting the presence of an object in the scene 22, is established individually for each detector scan line. This provides for a greatly enhanced image on the display 54 as compared to some other form of signal compensation based on the average intensity of the complete scene which is to be imaged.

Figure 2:
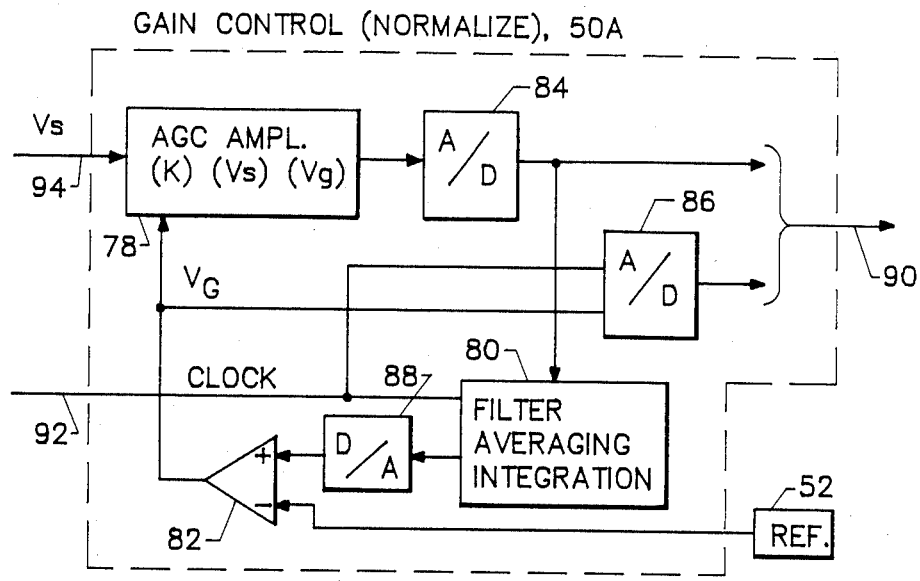
FIG. 2 is a detailed block diagram of a simplified embodiment of the gain control circuitry providing only the functions of averaging and normalizing in one channel of the system of FIG. 1.
Figure 3:
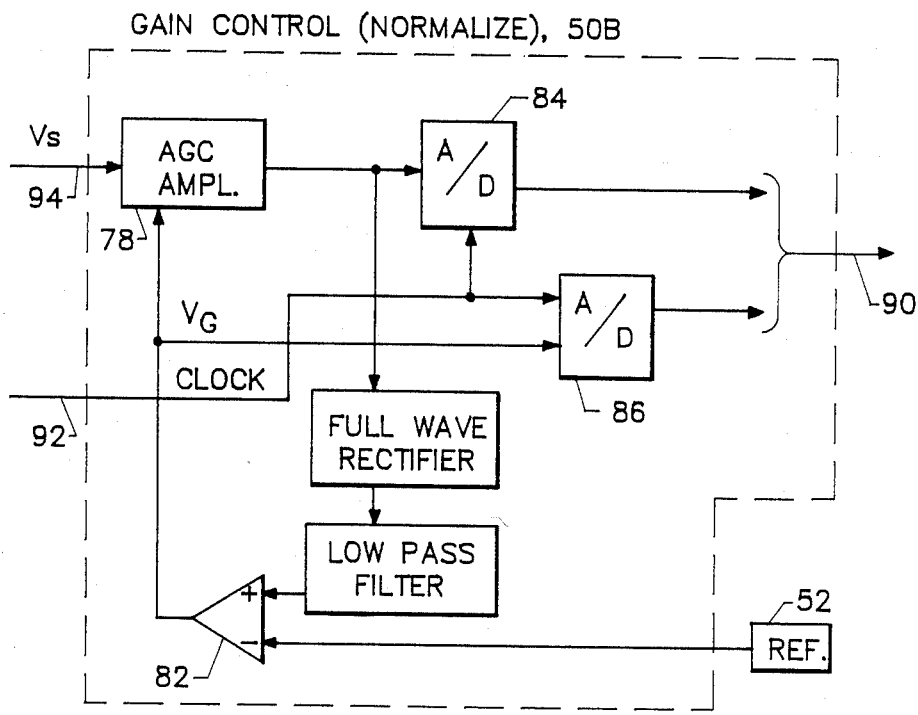
FIGS. 3 and 4 show alternative embodiments of the simplified gain control circuitry of FIG. 2.
Figure 5:
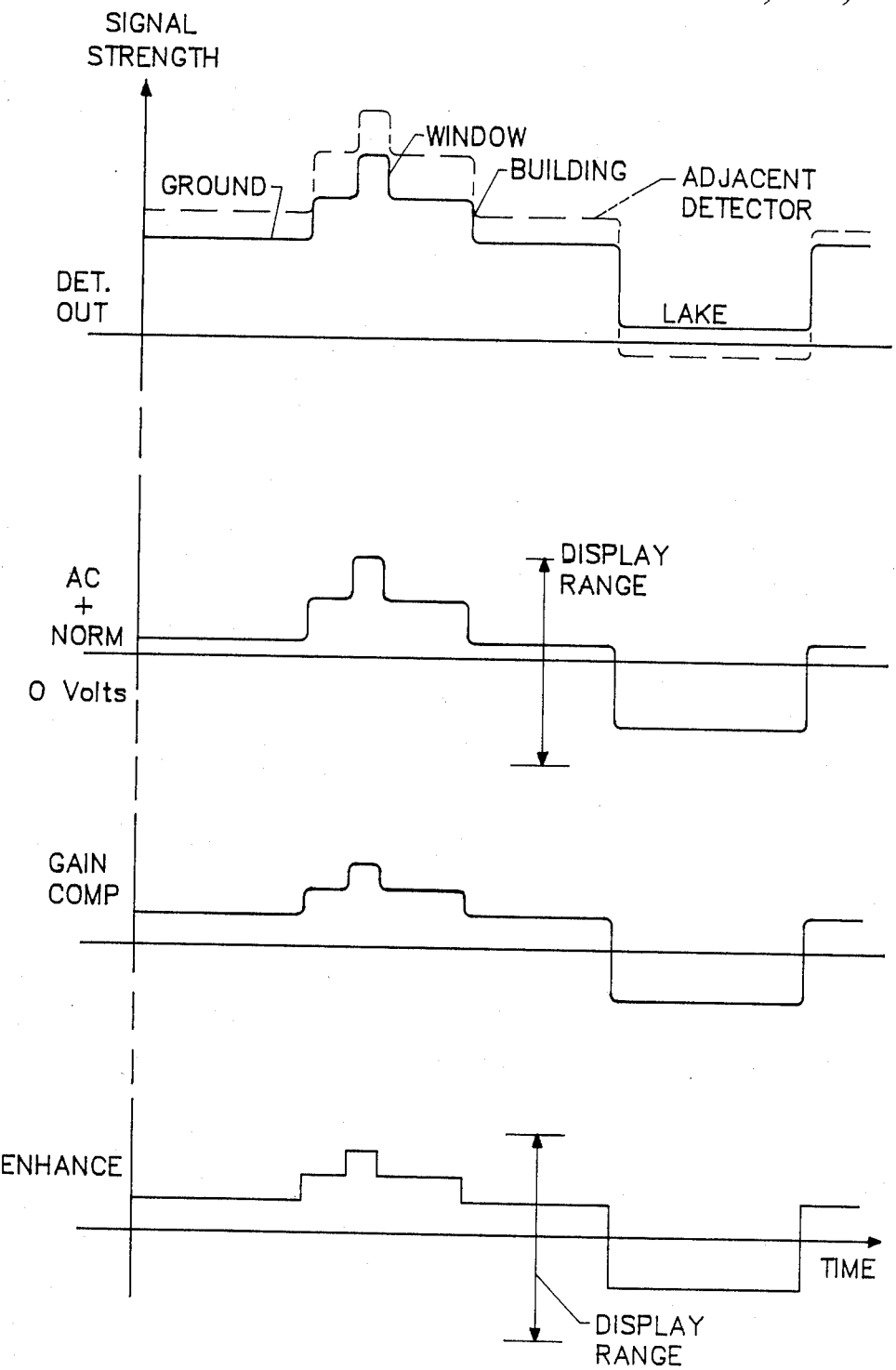
FIG. 5 shows a set of signal waveforms useful in explaining the operation of the gain control circuitry.
Figure 6:
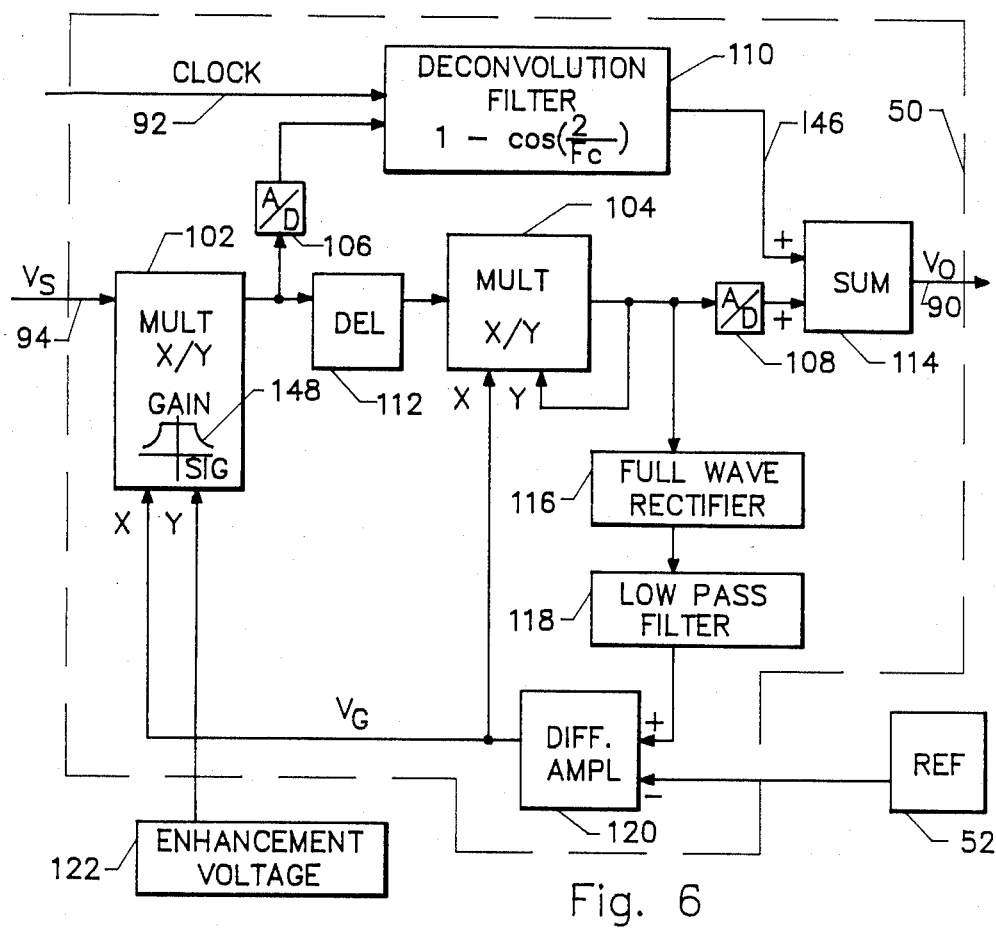
FIG. 6 shows the circuitry of a complete embodiment of the gain control circuitry of FIG. 1, the embodiment of FIG. 6 providing the additional inventive features of gain compression and spectral enhancement of edge lines of subjects in an image of a scanned scene of FIG. 1.
Figure 4:
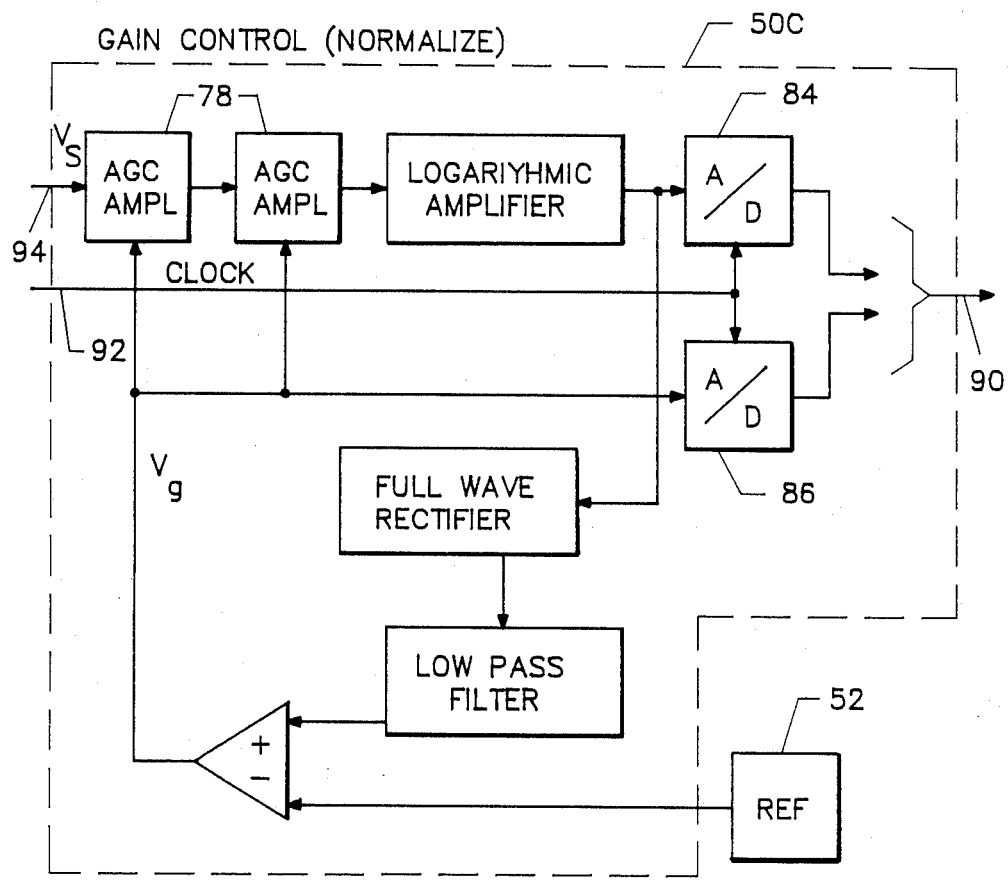
Figure 14:
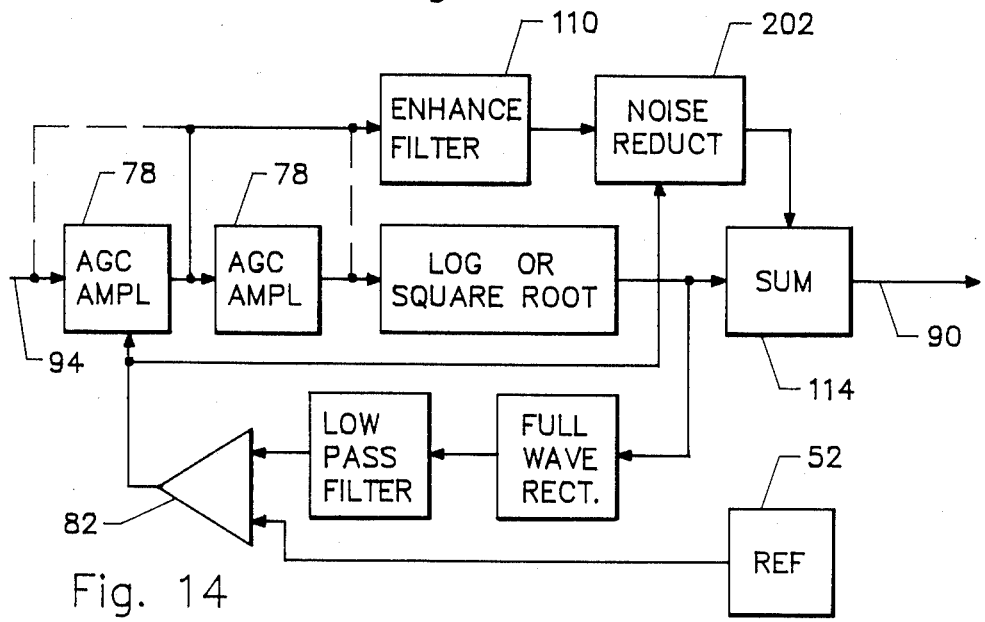
Figure 15:
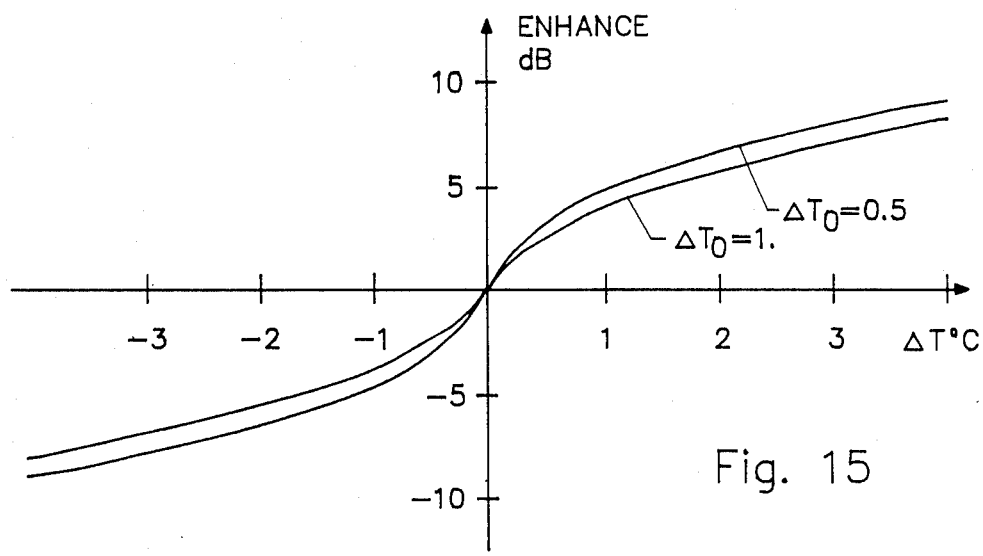
Figure 16:
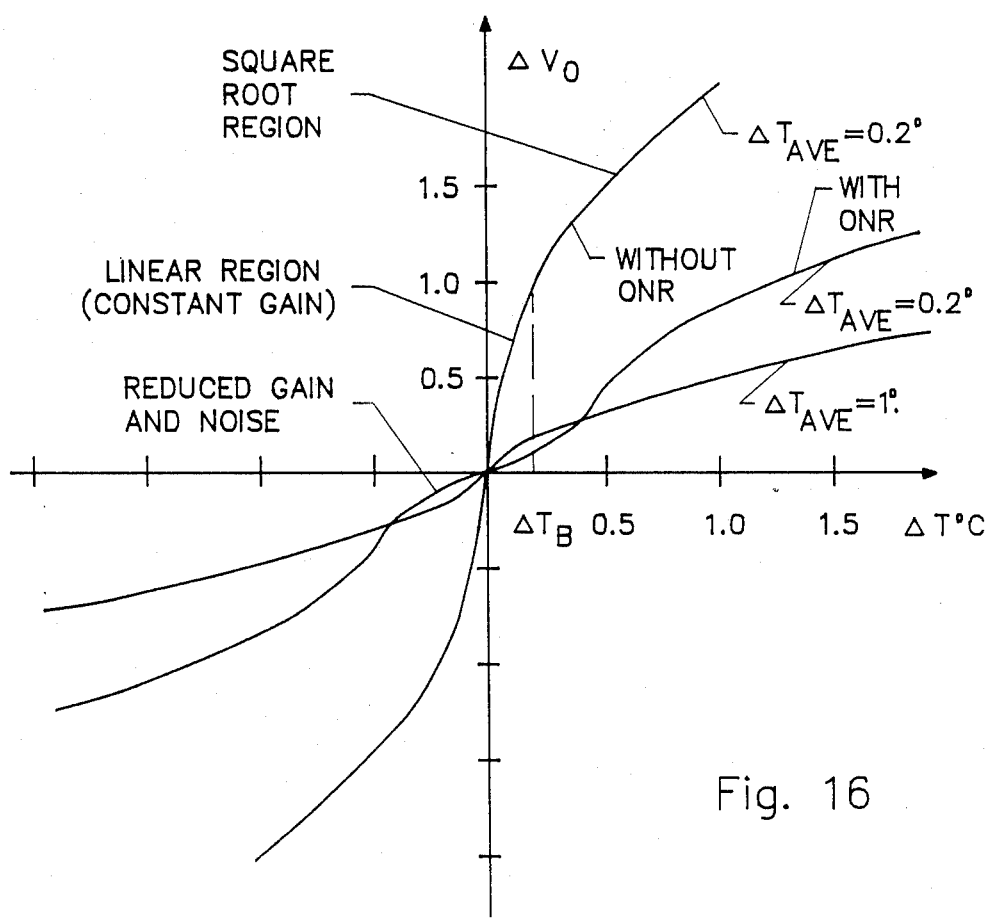

In the succeeding drawing figures, the FIGS. 2, 3 and 4 show simplified embodiments 50A, 50B and 50C, respectively, of the gain controller 50; the circuitry of the simplified embodiments providing only the functions of averaging and normalizing without the adaptive enhancement function. FIG. 5 shows signal waveforms, average values thereof and enhanced waveforms. FIG. 6 shows the full circuitry of the controller 50 for providing adaptive enhancement, and improved dynamic range in addition to the normalization function. The simplified embodiments of FIGS. 2, 3 and 4 are useful in explaining the normalizing function and its relationship to the operation of the system 20. This will facilitate an explanation of the enhancement circuitry of the invention which will be presented herein with reference to FIG. 5.

With reference also to FIG. 2, the gain controller 50A comprises an amplifier 78 having automatic gain control which operates in response to a control signal Vg, a digital filter 80 providing the functions of averaging and integration, a differential amplifier 82, and three analog-to-digital converters 84, 86 and 88. In operation, the construction of each of the gain controllers 50A is the same, this being the construction shown in FIG. 2. The amplifier 78 receives an input signal voltage Vs from a filter 48 (FIG. 1) and provides an output voltage proportional (by a constant K) to the product Vs and Vg. The output signal of the amplifier 78 is converted to digital format by the converter 84.

The output signal of the converter 84 is applied to the filter 80, the output thereof being converted to analog format by the digital-to-analog converter 88 and applied by the converter 88 to a positive input terminal of the amplifier 82. The amplifier 82 has a differential input and subtracts from the output signal of the converter 88 the reference voltage which is applied by the source 52 to the negative input terminal of the amplifier 82. The amplifier 82 provides, at its output terminal, the signal Vg which is applied to the amplifier 78 and is also applied to the converter 86. The signal Vg is in analog form and is converted to digital format by the converter 86. The output digitally formatted signals of the converters 84 and 86 are coupled via line 90 to the storage unit 56 (FIG. 1).

The filter 80 is constructed in the form of a low pass filter to provide for the functions of averaging and integration of a succession of digital samples of the detector signal Vs provided by the converter 84. The converters 84 and 86, as is well known, sample their respective input signals in response to clock pulse signals provided by the clock 30 on line 92. Operation of the filter 80 in response to the clock signals on line 92 synchronizes the operation of the filter 80 and converters 84 and 86. A set of lines 94 couple respective ones of the foregoing voltages Vs from respective ones of the filters 48 to corresponding ones of the gain controllers 50A. In view of the above-noted connection of the clock 30 to the scan drive unit 40, the period of time elapsed during the averaging or integration time of the filter 80 is in a fixed ratio to the scan period provided by the scanner 24.

The construction of the gain controller 50A is in the form of a feedback loop wherein the loop error signal is formed at the differential amplifier 82, and wherein the output signal Vg is proportional to the difference between the reference signal of the source 52 and an averaged signal of a detector 32.

A relatively large average value of detector signal, provided by the filter 80, results in a relatively small differential signal at the amplifier 82, with the result that the gain control signal Vg is small. Accordingly, detector signals of relatively large average value are multiplied by a relatively small gain control signal so as to provide an average value of output signal on line 90 which approximates the value of the reference signal from the source 52. Correspondingly, detector signals of relatively small average value are multiplied by relatively large gain signals so as to provide an average value of output signal on line 90 which is held relatively constant by the reference signal from the source 52. In this way, the gain controller 50A provides a gain control signal which is inversely proportional to the average value of the detector signal.

Furthermore, the average values of the detector signals of respective ones of the channels are normalized thereby to a common reference signal for improved uniformity in the presentation of images on the display 54. Also, the gains applied by the amplifiers 78 in respective ones of the channels to the instantaneous values of detector signals, for presentation of individual pixels on the display 54, have been adjusted to compensate for differences in responsivities of the detectors 32 and for differences in average subject matter in the swathes of the scene 22 swept out by the respective detectors 32. Thereby the uniformity of scene image presentation is improved.

With respect to the operation of the data processor 28, it is noted that complete data as to the magnitude of the detector signal is provided to the storage unit 56. This accomplished by use of the two converters 84 and 86 wherein the scaled signal of the converter 84 and the scale factor, represented by the magnitude of the signal Vg, is provided by the converter 86. The digital signals of the converters 84 and 86 provide two digital words which are readily stored to provide data as to the magnitude of the detector signal.

In operation, the scanner 24 of FIG. 1 repetitively scans linear portions of the scene 22 to direct scene radiation to the array of detectors 32, with each detector 32 detecting the radiation of a specific one of the linear portions of the scene 22. In response to the incident radiation, each detector 32 produces an output signal which is amplified by an amplifier 46. The amplifier 46, being AC coupled, responds only to changes in radiation resulting from the scanning, thereby to delete any residual output signal of a detector 32 and any background radiation of the scene 22. After filtering by the corresponding low pass filter 48, of the detector channel, the signal at the amplifier 46 enters the corresponding gain controller 50 to be multiplied by a gain control signal inversely proportional to the average value of the detector signal.

Changes in signal strength propagate through the gain controllers 50 to be stored as data in the storage unit 56. The filter 80 alters the gain of the amplifier 78 in accordance with the average value of the signal. The plane of scanning may be parallel to the long dimension of a region of substantially constant temperature in the scene 22, such as the sky or the land, so as to obtain more fully the benefits of the averaging function of the filter 80 in each of the detector channels. This permits the display 54 to present data from a scene having high dynamic range between different detector channels with respect to subject temperature.

In view of the foregoing operation, the imaging system 20 is able to operate without manual calibration of the individual detector channels. The foregoing averaging function of the filter 80 in the feedback loop of the controller 50 automatically compensates for any increased or decreased gain associated with individual responsivities of detectors 32 to the incident radiation. Thereby, the circuitry in each of the channels of the signal processor 26 serves to normalize each of the respective detector signals to provide uniformity of a displayed image. Since a common reference signal, from the source 52, is used in all of the channels, the gains of the respective channels are equalized independently of variations in detector sensitivity. This provides uniform development of the scene image between adjacent scanned regions of the scene. The uniformity is obtained even in the presence of different temperature response characteristics among the various detectors in the array of detectors 32.

By way of alternative embodiments, it is noted that the digital filter 80 may be replaced with an analog low pass filter such as an RC (resistor-capacitor) filter, as is shown in the gain controller 50B of FIG. 3. With the analog RC filter, the clock signal on line 92 would no longer be utilized by the filter. In addition, the converter 88 would no longer be employed at the output of the filter since the output signal is already in analog format. In addition, the input terminal of the low pass filter would no longer be connected to the output terminal of the converter 84 but, rather, would be coupled via a full wave rectifier to the output terminal of the amplifier 78.

The full wave rectifier is employed in view of the AC coupling of the amplifier 46. The rectifier converts the AC signal format of positive and negative excursions of the signal waveform to a unipolar waveform which is to be filtered by the analog low pass filter. A fully analog system may be constructed, if desired, by applying the output signals of the amplifier 78 and 82 directly to a television-type display (not shown) without use of the converters 84 and 86. In this case the drive unit 40 can be driven by 60Hz power line current without use of the clock 30.

The foregoing benefits are obtained also with a further embodiment of the gain controller 50 which introduces a nonlinear gain compression. By way of example, as shown in the gain controller 50C of FIG. 4, the gain control amplifier 78 may be followed by a second such amplifier, the latter amplifier also being controlled by the gain signal Vg, and being followed by a logarithmic amplifier to introduce a square root to the product of the gains of the three serially connected amplifiers. Again, the feedback loop construction tends to zero the loop error signal at the differential amplifier 82 so that average values of the radiation detector signal are brought into substantial equality as set by the value of the reference signal of the reference source 52.

FIG. 5 shows a set of graphs useful in understanding the operation of the system 20 and the gain controller 50. In the first graph there is shown a solid line which represents the output signal strength, in volts, of a detector 32 as a function of time during a single sweep of the scan. Since the scanning is done at a fixed angular rate, a horizontal scan being shown in FIG. 1, the presentation along the horizontal axis in each of the graphs of FIG. 5 is also proportional to the azimuthal angle swept out by the mirror 36. Thus, the waveform presented by the solid line in the first graph represents variations in temperature sensed by the detector 32 as a swath of the scene is swept. By way of example, the swath is presumed to pass through the building 64 and the lake 66 of the scene 22. A higher signal strength is associated with a relatively high temperature of radiation emitted by the subject matter, and a lower signal strength is associated with a relatively low temperature of the radiation. The dashed trace represents, by way of example, the signal outputted by an adjacent one of the detectors 32.

A feature of the invention is found in the attainment of uniformity by altering the gains of respective detector channels to compensate for individual differences in their responsivity to incident radiation, and also to normalize the gain in each channel in accordance with subject matter therein. It is noted that the preception of data in an image on the display 54 by a human observer is dependent primarily on observation of edge lines of subjects such as the building and the lake. While it is desirable to have hotter targets or subjects represented by bright regions on the display 54, and cooler targets represented by darker regions on the display 54, it is noted that the actual temperatures of the various subjects is not of primary concern in extracting data from the image. Rather, it suffices that an observer can determine which of the targets is hotter and which of the targets is cooler for identifying the targets. Accordingly, in the process of the detector signals, it is important to adjust the gains of the various detector channels to assure that the dynamic range of signals in each of the detector channels can be adjusted to fall within the dynamic range of signals which can be accommodated by the display 54. This is demonstrated in the first two graphs of FIG. 5.

Upon examination of the first graph of FIG. 5, it is noted that the signals of the two detectors each have a DC component which carries no useful information for an observer of the display 54. The DC level is removed by the AC coupling of the amplifiers 46, as portrayed in the second graph of FIG. 5. The normalization provided by the gain controller 50 in each of the channels is responsive to the average value of the AC signal in each of the respective channels, as well as to the common reference signal of the source 52. As a result, the gains of the respective channels, including the gain contribution produced by the responsivity of the detector to the infrared radiation, are substantially equalized among the respective detector channels. This is also shown in the second graph of FIG. 5 wherein the dashed line representing the adjacent detector signal has been deleted. Only a single line is shown because the normalized signal strengths for two channels processing similar subject matter are substantially the same.

A characteristic of the scanning operation is a slight blurring of the edge lines of the subject matter. This may be viewed, mathematically, as the convolution of a characteristic of the scanning optics with the subject matter. The blurring of the edge line is depicted in the first three graphs of FIG. 5 by rounded corners at the interface between two different portions of the subject matter. For example, such rounding is shown between the vertical line representing the side of the building and the horizontal line representing the ground. In the foregoing example, the building is presumed to have a window which radiates radiation at a higher temperature than that of the rest of the building, this being portrayed by a pulse-shaped signal riding on top of the building waveform. Again, the corners of the window waveform are rounded due to the foregoing blurring. Similar blurring occurs at the boundary between the lake and the ground.

In FIG. 5 there is shown a vertical line representing the range of values of amplitude, from the coolest subject to the hottest subject which can be presented on the display. This represents the lower and upper limits of the gray scale of the display. The presentation in the second graph is folded about the zero volts DC, this being at the horizontal axis of the graph and also defining the center of the gray scale of the display 54.

The third graph shows the effect of a gain compression produced by the gain controller 50. The overall gain has been reduced sufficiently such that the hot subject matter of the window can fit within the gray scale of the display. However, in accordance with a feature of the invention, such gain compression is to be accomplished in a nonlinear fashion in which relatively small signals, these being signals near the horizontal axis in the second through fourth graphs are amplified with a relatively high gain while large signals, including both positive and negative excursions from the horizontal axis are amplified with a relatively low gain. As will be disclosed hereinafter, a graphical portrayal of the gain is symmetrical about the zero volts AC axis and follows a square root function. This form of nonlinear gain characteristic increases the chances that an observer will be able to see subjects having temperatures near the foregoing voltage reference axis. The relatively strong signals are readily observed by the observer even with the reduced gain.

The effect of the blurring is corrected in the fourth graph which shows the effect of the enhancement circuitry of the gain controller 50 which will be described hereinafter. In particular, it is noted that the enhancement circuit has boosted the gain at the higher frequency portion of the signal spectrum so as to restore the sharp corners to the images of the subjects of the scene 22. Such restoration of the sharp corners restores the edge lines of the subject portrayed on the display, and allows an observer an opportunity to extract data from the display even in the presence of the gain compression. Thereby, the overall range of the signals in an individual detector channel has been compressed to fit within the gray scale of the display, thereby permitting the display to show all of the details of the subject without any loss of data due to saturation or streaking of the displayed image. Also, the restoration of the edge lines further improves the capability for extracting data from the displayed image.

As shown in FIG. 6, the gain controller 50 comprises two multipliers 102 and 104, two analog-to-digital converters 106 and 108, a deconvolution filter 110, a delay unit 112, a summer 114, a full wave rectifier 116, a low pass filter 118, and a differential amplifier 120. Each of the gain controllers 50 is of the same construction, and each receives a clock pulse signal via line 92 from the clock 30, and input signal to the multiplier 102 via a line 94 from a corresponding filter 48 (FIG. 1), and outputs a digital signal on line 90 to the storage unit 56. The reference signal from the source 52 is applied to a negative input terminal of the differential amplifier 120 in each of the controllers 50, and a reference enhancement voltage is applied from a source 122 (FIG. 1) to an input terminal of the multiplier 102.

Each of the multipliers 102 and 104 has a construction similar to that of the amplifier 78 (FIGS. 2-4) for multiplying the analog input signal on line 94 by a gain control signal provided by the differential amplifier 120, this gain control signal being identified by the letter X. In addition, each of the multipliers 102 and 104 is provided with a further control terminal, identified by the letter Y, the multiplier including circuitry for dividing the input signal on line 94 by the signal applied to the Y terminal. Analog circuitry, such as that employed in each of the multipliers 102 and 104, is commercially available for providing the dual functions of multiplication and division. In the case of the first multiplier 102, the enhancement voltage from the source 122 is applied directly to the Y terminal for reasons which will become apparent subsequently. In the case of the second multiplier 104, the output terminal thereof is coupled to the Y terminal to introduce the nonlinear, square root gain characteristic as will be explained hereinafter. The two multipliers 102 and 104 are serially connected via the delay unit 112 to provide for serial multiplication and division of the input signal of line 94 by the signals applied to the respective X and Y terminals.

The output analog signal of the multiplier 104, which signal has a waveform similar to that of the third graph of FIG. 5, is applied to the full wave rectifier 116 for rectification of the waveform about the horizontal axis of the third graph of FIG. 5. The output signal of the rectifier 116 is coupled via the low pass filter 118 to the negative input terminal of the differential amplifier 120. The rectified waveform provided by the rectifier 116 contains information as to the instantaneous amplitude of the output signal of the mulitplier 104. Averaging by the low pass filter 118 produces a signal which represents the average magnitude of the output signal of the multiplier 104. The operation of the rectifier 116 and the filter 118 corresponds to that previously described with reference to the rectifier and filter of FIG. 3. Also, the operation of the differential amplifier 120 corresponds to that of the amplifier 82 previously described with reference to FIG. 3. Thus, the output signal of the amplifier 120 corresponds to the output signal of the amplifier 82 in FIGS. 2-4.

The operation of the gain controller 50, with respect to functions provided by the multipliers 102 and 104, the rectifier 116, the filter 118 and the differential amplifier 120, accomplishes the functions of averaging and normalization described previously with respect to the corresponding components of the simplified embodiments of the gain controllers shown in FIGS. 2-4. The components of the controller 50 of FIG. 6 provide still further functions, as will be disclosed hereinafter, but with respect to the foregoing functions of averaging and normalization, the operation of the multipliers 102 and 104, the rectifier 116, the filter 118 and the amplifier 120 may be regarded as substantially the same as that disclosed with reference to the simplified embodiments of the controller shown in FIGS. 2-4. Accordingly, the instantaneous value of an input signal on line 94 is multiplied twice by a gain control signal from the differential amplifier 120, wherein the gain control signal is dependent on the difference between the average magnitude of the input detector channel signal on line 94 and the reference signal of the source 52. In view of the full wave rectification provided by the rectifier 116, the output signal of the rectifier 116 is always positive so as to represent the magnitude, rather than the amplitude, of the signal on line 94. Thereby, as the signal on line 94 increases in average magnitude, the signal applied to each of the X terminals decreases in magnitude; correspondingly, upon a decrease in average magnitude of the signal on line 94, the gain control signal applied to each of the X terminals increases in amplitude. Thereby, weak signals are amplified sufficiently to be viewed on the display 54, while strong signals receive less amplification so as to avoid saturation of the display 54.

The gain controller 50 provides the further function of adaptive frequency enhancement by means of the deconvolution filter 110 which is connected in parallel with a portion of the feed forward branch of the circuit of FIG. 6. The filter 110 operates as a linear phase filter and, by way of example, is presumed to be constructed of digital circuitry, it being understood that such filters can also be constructed of analog circuitry. The circuitry of the filter 110 is clocked by clock pulses on line 92 applied to a clock input terminal of the filter 110. A signal input terminal of the filter 110 is coupled via the converter 106 to the output terminal of the multiplier 102. The output signal of the filter 110 is applied to an input terminal of the summer 114, the second input terminal of the summer 114 being connected via the converter 108 to the output terminal of the second multiplier 104. By virtue of the foregoing connection, the multiplier 104 in the forward branch of the circuit of FIG. 6 is in parallel with the filter 110.

The gain controller 50 provides a further feature of the invention, namely, the aforementioned nonlinear gain characteristic. As has been noted above, the characteristic is in the form of a square root function and is obtained by virtue of the connection of the output terminal of the second multiplier 104 to its Y input terminal. As will be explained subsequently, the foregoing connection of the output terminal of the multiplier 104 to its Y input terminal provides an additional feature wherein a signal enhancement function provided by the filter 110 is proportional to the signal strength. The signal strength is proportional to the temperature increment of subjeact matter of the scene 22 (FIG. 1) as measured relative to the horizontal axis of the second graph of FIG. 5. The multiplication of the filter function by the signal strength makes the operation of the controller adaptive in the sense that the controller 50 boosts the higher frequency components of the signal spectrum to restore the edge line (as shown in the fourth graph of FIG. 5), with such boosting being done only for the relatively strong signals while, in the case of relatively weak signals, the amount of such boost is substantially reduced. This adaptive feature is most useful in avoiding the amplification, or boosting of noise in situations of very weak signals wherein the very weak signal is close to that of the noise level.

The response of the filter 110 to the various portions of the signal spectrum is such that the response drops towards zero for signal frequency components near the low frequency end of the signal spectrum, and peaks for signal frequency components at the upper end of the signal spectrum, which portion of the signal spectrum is primarily responsibale for the clarity in presentation of the edge lines of the stand subject matter. At still higher frequencies, the response of the filter 110 again drops toward zero. The delay unit 112 provides symmetrical impulse response required for linear phase operation.

Thereby, the gain controller 50 is able to compensate for blurring of the subject matter by the scanning optics.

Figure 7:
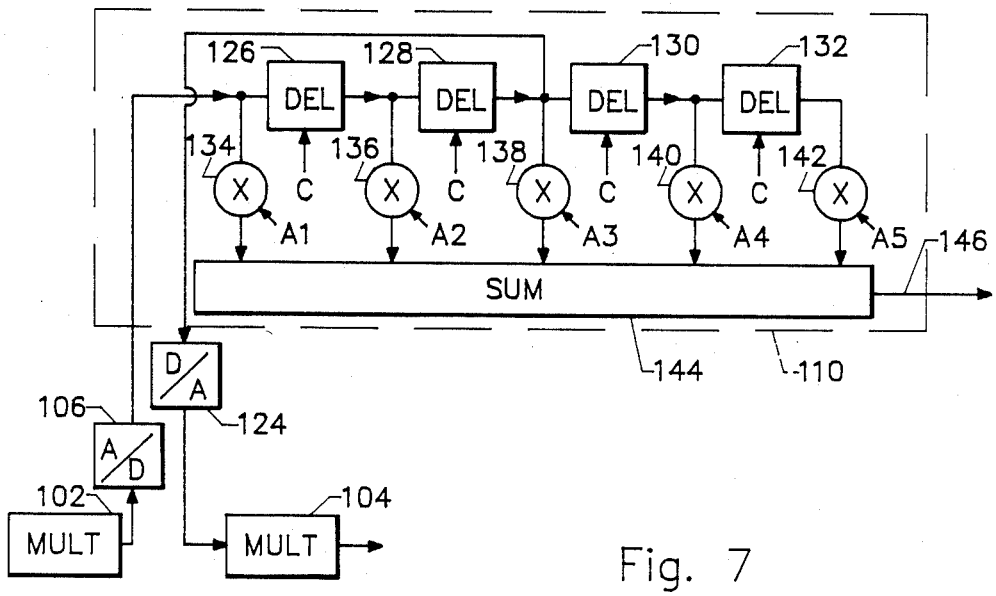
FIG. 7 shows a digital circuit form of construction of an enhancement filter of FIG. 6, and an alternative circuitry of delay compensation in two branches of the gain control circuitry.

FIG. 7 shows a common form of construction employing digital circuitry for providing the linear phase cosine filter function. In addition, FIG. 7 shows an alternative interconnection among the two multipliers 102 and 104 and the filter 110 wherein the delay unit 112 is eliminated, and delay units within the filter itself are employed to provide the requisite delay. With the alternative interconnection scheme of FIG. 7, the digital-to-analog converter 124 connects the filter 110 with the input terminal of the multiplier 104.

The filter 110 comprises four delay units 126, 128, 130 and 132, five multipliers 134, 136, 138, 140, and 142, and a summer 144. Each of the delay units 126–132, which may comprise shift registers (not shown), are clocked by clock pulses C, from line 92, with each of the delay units 128–132 providing delays equal to the duration of a signal providing data for ½ pixel of the display 54. The delay units 128-132 are coupled together serially, with the nodes of the serial combination being connected by the multipliers 134-142 to input terminals of the summer 144. The multipliers 134–142 multiply signals at the foregoing nodes by scale factors designated respectively as A1, A2, A3, A4 and A5 in FIG. 7. The summer 110 sums together the output signals of the multipliers 134–142, and provides the sum on line 146, this being the output terminal of the filter 110.

In the operation of the filter 110, it is noted that the output signal is composed of input signal components which have been delayed by one, two, three, or four delay increments. This is a relatively short interval of time, in that the maximum delay contribution is equal to only the time required to scan over a portion of the scene 22 depicted by only two pixels on the display 54. The delay imparted by the delay unit 112 in FIG. 6 is equal to half of the maximum delay contribution, this being a delay equal to the one increment of delay imparted by the delay units 128 and 130. Accordingly, in the alternative interconnection scheme shown in FIG. 7, the same two delay units 128 and 130 are employed for applying the delay to signals incident upon the multiplier 104 in lieu of the delay unit 112. This is accomplished by connecting input terminal of the converter 124 to the node between the delay units 128 and 130, this being at the center of the series connection of the delay units 126-132.

Figure 8:
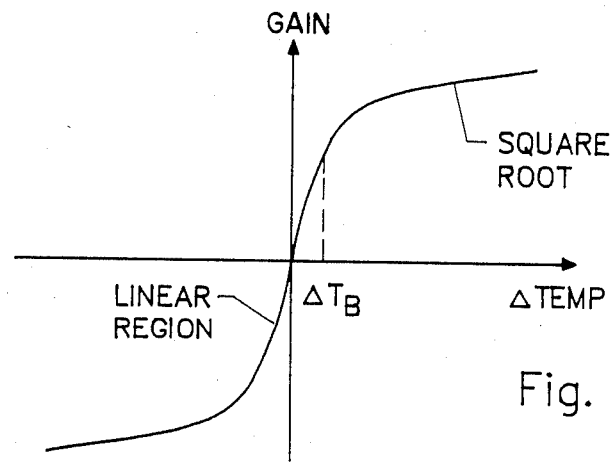
FIG. 8 shows a nonlinear gain characteristic provided by the circuitry of FIG. 6.

In FIG. 8, there is shown a graph of the nonlinear gain characteristic imparted by the serial connection of the two multipliers 102 and 104 (FIG. 6) with the output signal of the serial connection being applied to the divider or Y, input terminal of the second multiplier 104. The horizontal axis in the graph of FIG. 8 is the vertical axis appearing in the second, third and fourth graphs of FIG. 5. The gain is symmetrical about the horizontal axis for both positive and negative increments in signal strength, or increments in temperature of the subject matter, so that both positive and negative signals are multiplied by the same gain factor. The gain characteristic generally follows the square root function with the exception of the region of the graph near the horizontal axis. As has been explained hereinabove, large signals are multiplied by small gain factors while smaller signals are multiplied by larger gain factors in the multipliers 102 and 104. As is well known, such multipliers have a limited region of operation in which the foregoing relationship can be maintained. Accordingly, for very small signals, an upper limit is reached for the multiplying factor, after which the multiplying factor remains constant for still smaller values of signal strength. The constant gain associated with the near-zero values of signal strength, or near-zero of temperature increment from the reference value of the horizontal axis, results in a linear region in the gain curve imparted to signals on line 94 by the controller 50. The gain control portrayed in the graph of FIG. 8 applies to signal components throughout the signal spectrum, and does not include the additional boost provided by the deconvolution filter 110. As noted above, the boost provided by the filter 110 appears in an adaptive fashion, more boost for stronger signals and primarily for only those frequency components at the high frequency end of the signal spectrum. The foregoing inverse relationship in the operation of the multipliers 102 and 104 is depicted in a graph 148 shown within the block of the multiplier 102; the graph 148 shows how the gain increases with decreasing signal strength and reaches a constant upper limit for values of signal of near-zero signal strength. The region of constant gain in the graph 148 corresponds to the linear region in the overall gain of the controller 50 as depicted in the graph of FIG. 8. Both of the multipliers 102 and 104 have the same gain characteristic.

An explanation of the operation of the gain controller 50 particularly with respect to the development of the square root being characteristic and the adaptive frequency enhancement feature, can best be understood with reference to mathematical expressions presented below. In the following explanation the derivation of the square root relationship is provided first. This is followed by a derivation of the overall response of the feedback loop configuration of the circuit of FIG. 6 including the feed forward branch of the deconvolution filter to attain the desired adaptive enhancement feature.

Figure 9:
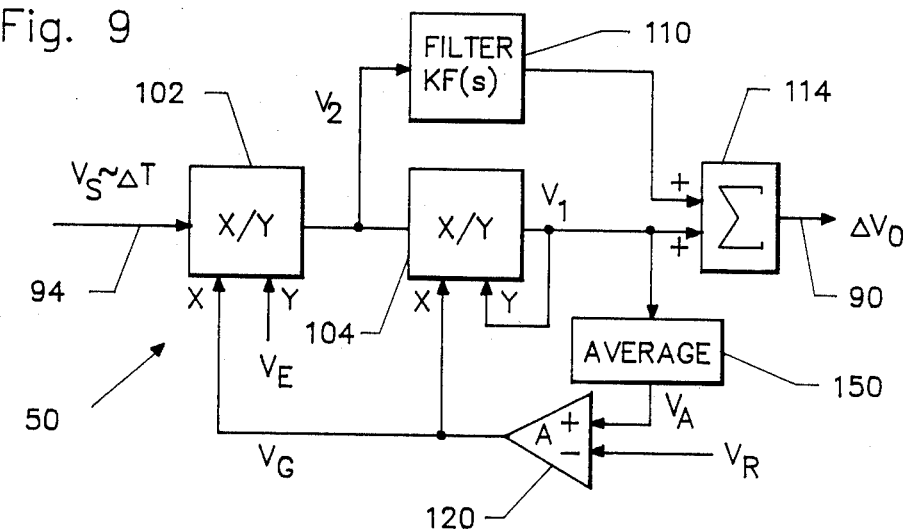
FIG. 9 is a simplified diagram of the circuit of FIG. 6.

The derivation of the square root relationship may be demonstrated with the aid of a simplified drawing of the circuitry of the gain controller 50 as shown in FIG. 9. The input signal $V_S$ is proportional to the incremental temperature $\Delta T$ of a subject being scanned. The output voltage of the second multiplier 104 is shown as $V_1$, and is given by the product of both multipliers:

$$V_s \cdot \frac{V_G}{V_E} \cdot \frac{V_G}{V_1} = V_1 \tag{1}$$

from which $$V_1 = \frac{V_G}{\sqrt{V_E}} \sqrt{V_s} \tag{2}$$

where
 $V_G$ is the gain control voltage applied to terminal X in each of the multipliers 102 and 104, and
 $V_E$ is the enhancement voltage, which voltage has a constant value set by the source 122. Equation (2) shows that the voltage $V_1$ is proportional to the square root of the input voltage $V_S$. Thus, there is gain compression wherein the gain follows the nonlinear relationship shown in the graph of FIG. 8.

The graph of FIG. 8 shows a breakpoint temperature $\Delta T_B$ between the linear region and one branch of the square root function. The foregoing derivation with equations (1) and (2) assumes values of voltage within the normal operating range of the multipliers 102 and 104, and therefore describes only the square root region. Other nonlinear relationships such as a logarithmic function may also be employed as described in an article entitled "Image Processing for Quality Improvement" by William F. Schreiber, appearing in the *Proceedings of the IEEE*, December 1978, at pages 1640–1650; see particularly a graph of nonlinear brightness functions on page 1644. The foregoing square root relationship is optimal or close to optimal for presentation on a display.

The circuit of FIG. 9 has been simplified by deletion of the converters 106 and 108 and the delay unit 112 from FIG. 6. Also, the functions of the rectifier 116 and of the low pass filter 118 have been replaced with an averaging unit 150 providing a signal $V_A$ to the negative input terminal of the differential amplifier 120, the signal $V_A$ being a voltage proportional to the average magnitude of the signal $V_1$. The differential amplifier 120 has a voltage gain A. The transfer function of the deconvolution, or enhancement, filter 110 is give by $KF(s)$ wherein K is a constant and $F(s)$ is Laplace transform notation for the frequency response of the filter. The reference voltage from the source 52 is represented by $V_R$.

The foregoing open loop demonstration of gain compression (equation (2)) can also be obtained with the feedback loop as may be demonstrated by the following expression for the gain control voltage $V_G$ in terms of signals applied to the differential amplifier 120. Thus, $$V_G = (V_A - V_R) A. \tag{3}$$

Equation (2) applies also to average values of the voltages. The average value of $V_S$ is represented in the following equations by $V_{SA}$. The average value of $V_1$ is equal to $V_A$ for positive values of $V_1$, a simplification which is value because an average value remains substantially constant over the duration of a scan line. Substitution of equation (2) into equation (3) and using average values gives $$V_G = \left[ \sqrt{V_{SA}} \ \frac{V_G}{\sqrt{V_E}} - V_R \right] \tag{4}$$

transposing these terms, and making the approximation that $A \gg 1$ leads to $$V_G = (V_R) \frac{\sqrt{V_E}}{\sqrt{V_{SA}}} \tag{5}$$

Upon squaring both sides of equation (5) and substituting for $V_G^2$ from equation (5) into equation (1) gives:

$$V_1^2 = \left( \frac{V_S}{V_{SA}} \right) \cdot V_R^2 \tag{6}$$

The foregoing open loop demonstration of gain compression (equation (2)) can also be obtained with the feedback loop as may be demonstrated by the following expression for the gain control voltage $V_G$ in terms of signals applied to the differential amplifier 120. Thus, $$V_G = (V_A - V_R) A. \quad (3)$$

Equation (2) applies also to average values of the voltages. The average value of $V_S$ is represented in the following equations by $V_{SA}$. The average value of $V_1$ is equal to $V_A$ for positive values of $V_1$, a simplification which is value because an average value remains substantially constant over the duration of a scan line. Substitution of equation (2) into equation (3) and using average values gives $$V_G = \left[ \sqrt{V_{SA}} \ \frac{V_G}{\sqrt{V_E}} - V_R \right] \quad (4)$$

transposing these terms, and making the approximation that $A \gg 1$ leads to $$V_G = (V_R) \frac{\sqrt{V_E}}{\sqrt{V_{SA}}} \quad (5)$$

Upon squaring both sides of equation (5) and substituting for $V_G{}^2$ from equation (5) into equation (1) gives:

$$V_1{}^2 = \left( \frac{V_S}{V_{SA}} \right) \cdot V_R{}^2 \quad (6)$$

Letting the overall gain of the first multiplier 102 (including the effects of signals at the X and the Y terminals) be represented by $G_1$, and the corresponding gain of the second multiplier 104 be represented by $G_2$, the combined gain of the two multipliers is obtained, with reference to equation (6) as $$G_1 G_2 = \frac{V_1}{V_s} = \frac{1}{\sqrt{V_S V_{SA}}} V_R \quad (7)$$

With reference to FIG. 9, the total gain $G_T$ of the gain controller 50 including the branch of the filter 110, from the input voltage $V_S$ on line 94 to the output voltage $V_o$ on line 90 is given by $$G_T = \frac{V_o}{V_S} = G_1 G_2 + G_1 K F(s) \quad (8)$$

An expression for $G_1$ can be obtained by use of equation (5) giving $$G_1 = \frac{V_G}{V_E} = \frac{V_R}{\sqrt{V_E V_{SA}}} \quad (9)$$

A further expression for $G_T$ is obtained by substituting the expression for $G_1 G_2$ from equation (7) and the expression for $G_1$ from equation (9) into equation (8) giving $$G_T = \frac{V_o}{V_S} = \frac{V_R}{\sqrt{V_S \cdot V_{SA}}} + \frac{V_R K F(s)}{\sqrt{V_E V_{SA}}} \quad (10)$$

Rewriting equation (10) gives the output voltage as $$V_o = V_R \sqrt{\frac{V_S}{V_{SA}}} \left[ 1 + K \cdot \sqrt{\frac{V_S}{V_E}} \cdot F(s) \right] \quad (11)$$

where $V_s$ is proportional to the temperature increment $\Delta T$ and $V_{SA}$ is proportional to the average temperature increment $\Delta T_A$. Equation (11) has been derived for the condition that neither of the multipliers 102 and 104 have been drawn into saturation. This condition is met for $\Delta T \geq \Delta T_B$, namely, a temperature range outside the linear region of the graph in FIG. 8. Thus, the expression in equation (11) relates to the square root portion of the graph of FIG. 8 wherein gain compression is provided by the nonlinear (square root) gain characteristic.

The second term in the brackets of equation (11) is the frequency enhancement term of the deconvolution filter, the second term being proportional to the square root of the input signal $V_S$. The second term provides the adaptive characteristic to the gain controller 50 by increasing the high frequency boost with increasing signal strength, and decreasing the high frequency boost with decreasing signal strength.

The significance of the enhancement voltage $V_E$ of the source 122 becomes apparent from the second term in the brackets. The enhancement is inversely proportional to the square root of the enhancement voltage. $V_E$ appears only in the second term of the brackets and, therefore, provides independent control in the selection of the amount of high frequency boost to be applied in regenerating the edge lines of subjects in the scene image.

As noted above, the derivation of the relationships in equations (10) and (11) is subject to the condition that $\Delta T \geq \Delta T_B$. This precludes the situation wherein the gain of equation (10) would become excessively large for small values of $V_s$ in view of the presence of $V_s$ in the denominator of the first term.

In the case wherein the temperature increment is very small, $\Delta T \leq \Delta T_B$, the expression in equation (11) is changed to that of equation (12), namely, $$V_O = \frac{V_R V_S}{V_{SA}} [1 + K_1 F(s)] \quad (12)$$

in which the adaptive feature is no longer present.

Figure 10:
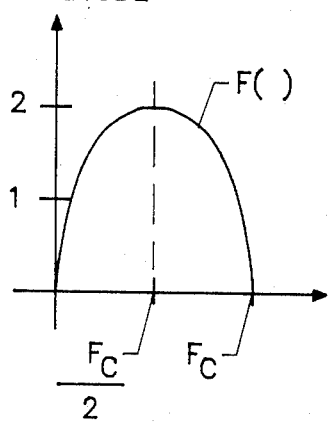
FIG. 10 shows a frequency response of the enhancement filter of FIG. 7.

The frequency enhancement term is given by $$F(w) = \left( 1 - \cos \frac{2w}{Fc} \right) \quad (13)$$

wherein W is the radian frequency and $F_c$ is the rate of clock pulses on line 92 from the clock 30. A plot of equation (13) appears in FIG. 10. The filter 110 may be tuned by varying the rate of clock pulses. The spectral frequencies of the signal in each detector channel, as represented by the radian frequency W, is dependent on the sizes of the targets in terms of their respective projections (in angular coordinates) on the scene image. In addition, the spectral frequencies are proportional to the scanning speed of the mirror 36. A desired relationship between the filter-tuning clock frequency and the scanning speed is maintained by driving both the filter and the scanning with a common clock, namely, the clock 30 of FIG. 1.

Figure 11:
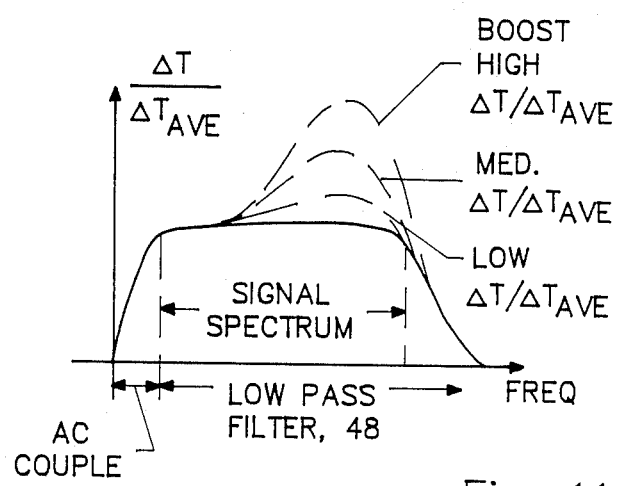
FIG. 11 shows overall system frequency response with differing amounts of enhancement due to an adaptive signal processing characteristic.
Figure 12:
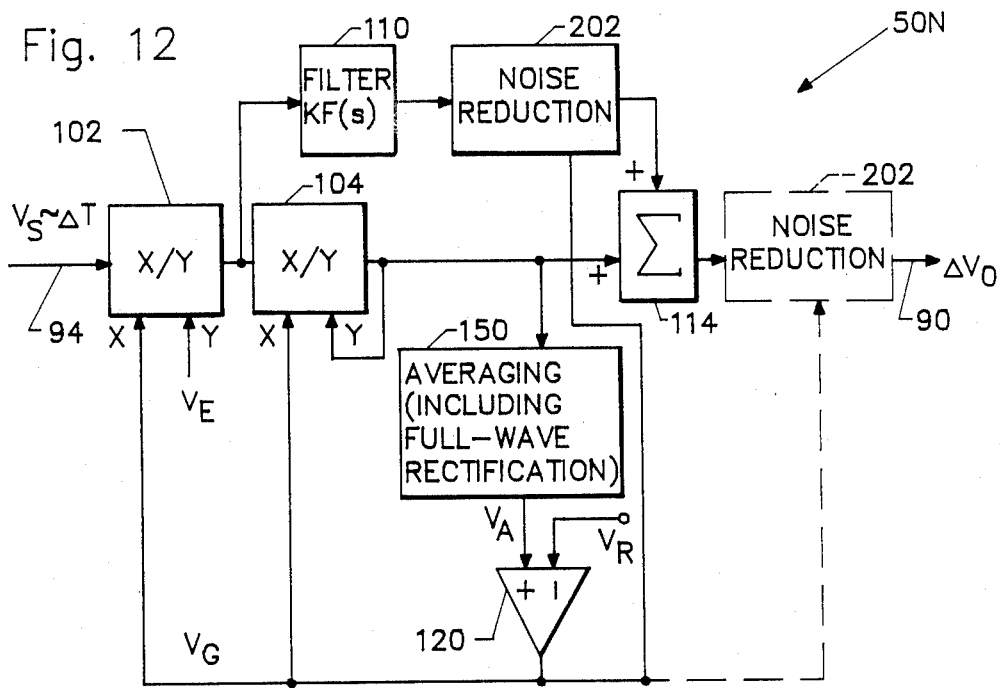
Figure 13:
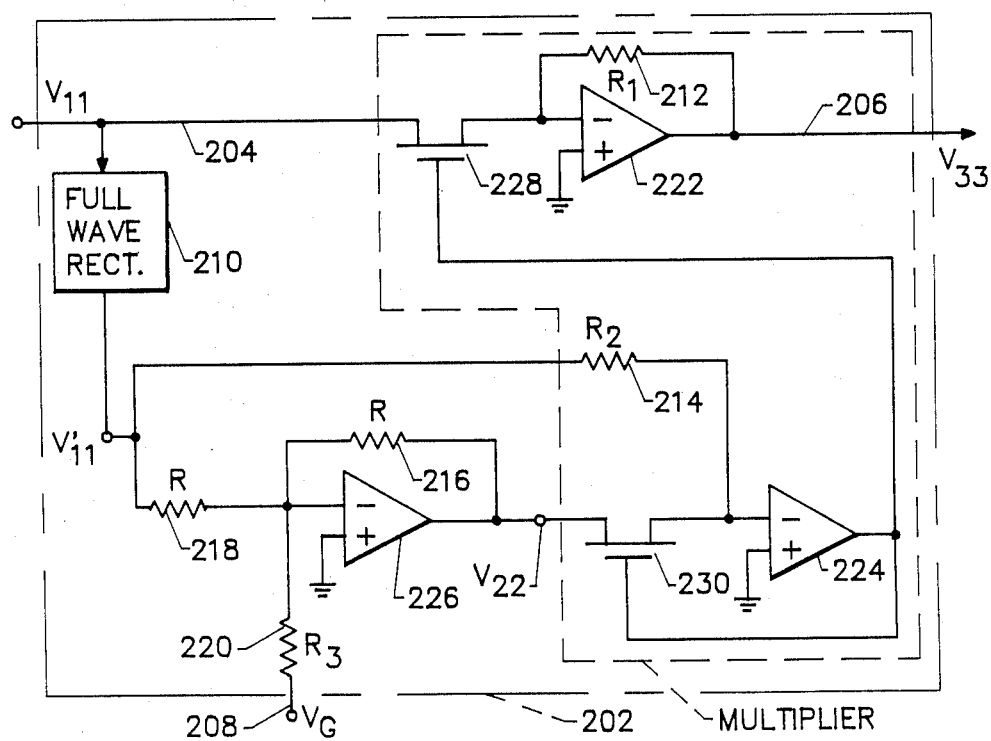

In FIG. 11, the graph shows the overall frequency response of the imaging system 20 including the contributions of the AC coupled amplifier 46 (FIG. 1), the low pass filter 48, and the gain controller 50 as represented by equation (11) for each of the detector channels. The solid trace shows the effect of the AC coupling and the low pass filter. Each dashed trace shows the summation of the high frequency boost (FIG. 10) with the response of the solid trace. The amount of boost for enhancement of the target edge lines is dependent, as noted above, on the signal strength obtained from temperature increments detected by the detectors 32. Three dashed traces are presented, by way of example, to show the effect of the enhancement boost for high, medium, and low values in the ratio of temperature increment to the average value of such increment.

With reference to the fourth graph of FIG. 5, the amount of enhancement is correct for restoration of the subject edge lines. However, the amount of enhancement varies with signal strength and, accordingly, the enhancement may under compensate or over compensate for the blurring of the subjects in the scene image. Over compensation appears as a brightening of the edges of a subject as compared to the rest of the subject presented on the display 54. Such brightening of the edges does not obscure data which an observer is to obtain from viewing the display. Under compensation of the enhancement reduces the sharpness of the image from that which would be provided by the signal of the fourth graph of FIG. 5, but is still better than that associated with the third graph of FIG. 5. In the case of a weak signal in a noisy environment, excessive enhancement is to be avoided because of the increased amplitude of the noise, which increased noise is brought on by the enhancement.

Thereby, the adaptive enhancement capability of the system 20 with its gain controller 50 provides a substantial improvement to the clarity of an image of a scanned subject.

It is to be understood that the above-described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An imaging system comprising:
an array of radiation detectors arranged along the vertical dimension of a scanning pattern;
means for directing radiation from a subject, distant from said system, toward said array of detectors to permit a viewing of said subject by said system, said directing means including means for scanning said radiation along a set of scan lines sweeping out adjacent regions of the subject with a scan interval of predetermined duration to provide a two-dimensional raster scan of a scene including said subject, each of said detectors providing a signal in response to radiation incident upon the detector;
means for displaying data to be carried by signals of respective ones of said detectors to present an image of the scene containing said subject;
signal processing means interconnecting said displaying means with said array of detectors, said signal processing means including gain normalizing means for amplifying individual ones of said detector signals with a gain varying inversely to average signal strength; and wherein said normalizing means is configured as a feedback loop and includes nonlinear means for introducing a nonlinear gain characteristic, said normalizing means including enhancement means for clarifying edge lines of said subject, said nonlinear means coacting with said enhancement means to provide an adaptive enhancement characteristic dependent on the strength of signals from the corresponding detectors.

2. A system according to claim 1 wherein said signal processing means comprises a set of channels with individual ones of said channels connecting with respective ones of the detectors in said array of detectors, and wherein said gain normalizing means and said enhancement means are structured as a set of gain control circuits, there being one of said gain control circuits in each of said channels.

3. A system according to claim 2 wherein each of said gain control circuits is structured as a feedback loop responsive to a loop error signal and comprises differential means for comparing an output signal of said averaging means with a reference signal to provide a loop error signal.

4. A system according to claim 3 wherein a first common reference signal is employed in each of said gain control circuits by said normalizing means for uniformity of gain among said channels, and a second common reference signal is employed in each of said gain control circuits by said enhancement means for designating the amount of enhancement.

5. A system according to claim 4 wherein each of said nonlinear means comprises means for multiplying a detector signal by the loop error signal to provide an output signal of said gain control circuit; and
each of said nonlinear means comprising first and second multipliers connected serially, each of said multipliers having an input terminal for receipt of said loop error signals, each of said multipliers having a divider input terminal wherein the divider input terminal of said first multiplier is connected to said second common reference signal, and the divider input terminal of said second multiplier is connected to the output terminal of said second multiplier to institute a square root gain characteristic.

6. A system according to claim 5 wherein said normalizing means comprises means disposed between an output terminal of said second multiplier and an input terminal of said differential means for averaging the signal of individual ones of said detectors over an averaging interval of time several times larger than the duration of said scan interval to enhance the uniformity of a data display of said displaying means with respect to said swept out regions of said subject.

7. A system according to claim 6 wherein said enhancement means comprises a linear phase filter connected in parallel with a feed forward branch of said feedback loop, said enhancement means further comprising a summer summing together an output signal of said nonlinear means with an output signal of said linear phase filter and wherein an input terminal of said linear phase filter is impressed with a signal by said nonlinear means.

8. A system according to claim 7 wherein said input terminal of said linear phase filter is connected to an output terminal of said first multiplier, said filter having a transfer function in the form of a constant minus the cosine of a term including the spectral frequency component of scanned subject matter.

9. A system according to claim 1 wherein said normalizing means comprises means for averaging the signals of individual ones of said detectors over an averaging interval of time several times larger than the duration of said scan interval said to enhance the uniformity of a data display by said displaying means with respect to said swept out regions; and gain normalizing means comprises means for multiplying an output signal of said averaging means by a detector signal to provide an output signal of said gain normalizing means.

10. A system according to claim 9 wherein said gain normalizing means comprises a feedback loop including differential means for combining a reference signal with the output signal of said averaging means prior to said multiplying.

11. A system according to claim 10 wherein said gain normalizing means and said enhancement means individually process signals of each of said detectors independently of the signals of other ones of said detectors, and wherein said radiation is infrared radiation.

12. An imaging system comprising:
an array of radiation detectors;
means for directing radiation from a scene being imaged towards said detectors, said directing means including means for scanning said radiation along a line of scan and means for supporting said array of detectors, said array of detectors being arranged transversely to said scan line to permit each detector to sweep out separate scan paths across said scene for generating an image of said scene;
said directing means being oriented relative to a scene such that said scan line is generally parallel to a boundary of a region of said scene having a uniform radiation characteristic;
means AC coupled to respective ones of said detectors for amplifying signals produced by respective ones of said detectors in response to radiation incident upon the detectors, said amplifying means including means for normalizing the gain of the amplifying to accentuate the presence of a target in an image of said scene, which target has a radiation characteristic different from radiation of background material in said scene; and wherein
said amplifying means includes means for adaptively accentuating a predetermined spectral portion of the signals of respective ones of said detectors to establish a separate background level in each scanned path of an image of said scene for improved uniformity of said image.

13. A system according to claim 12 wherein said radiation is infrared radiation, and wherein said radiation characteristic is the temperature of a region of said scene from which radiation emanates.

14. A system according to claim 12 wherein said amplifying means comprises a feedback loop having a forward branch, and wherein said spectral accentuating means comprises a nonlinear element disposed in said forward branch and a filter tuned to pass frequency components in the predetermined spectral portion, said filter being disposed in a feed forward branch in parallel connection with at least a portion of said forward branch for combined peration with said feedback loop and said nonlinear element, said combined operation with said nonlinear element producing an adaptive frequency response to said amplifying means.

15. A system according to claim 14 wherein said predetermined spectral portion is at the high frequency end of the spectrum of a detector signal.

16. In an imaging system for forming an image of a scene emitting radiation, which scene comprises an array of radiation detectors and means for directing radiation from a scene being imaged toward said detectors, said directing means including means for scanning said radiation along a line of scan and means for supporting said array of detectors, said array of detectors being arranged transversely to said scan line to permit each detector to sweep out separate scan paths across said scene for generating an image of said scene; a method comprising the steps of:

orienting said directing means relative to a scene such that said scan line is generally parallel to a boundary of a region of said scene having a uniform radiation characteristic;
amplifying signals of respective ones of said detectors produced by the detectors in response to radiation incident upon the detectors, said amplifying producing a gain in the amplitude of respective ones of the detector signals;
compressing said gain via a nonlinear gain characteristic;
averaging separately the detector signals subsequent to said step of amplifying to provide an average value of each detector signal in each scanned path of an image of said scene for improved uniformity of said image;
enhancing edge lines of subject matter which can be imaged by said imaging system, said enhancing being performed in concert with said compressing to provide adaptive enhancement of the edge lines; and
normalizing the gain of each of said detector signals by means of said differential signals for improved dynamic range of subject matter which can be imaged by said imaging system.

17. In an imaging system, a method according to claim 16 further comprising the step of comparing said average value for each said detector signals with a common reference to produce differential signals representing a difference between each of said average values and said reference; and
wherein said steps of averaging and normalizing compensate for variation in responsivity of said detectors to the radiation, and radiation being infrared radiation, said dynamic range being a range of temperature of subject matter being imaged, and said radiation characteristic being the temperature of the subject matter being imaged.

18. In an imaging system, a method according to claim 16 wherein said enhancing includes a filtering of a detector signal for accentuating a high frequency portion of the signal spectrum, and a summing of the accentuated frequency portion with an amplified signal produced by said amplifying.

19. In a multiple channel infrared imaging system employing a scanning of object space, the improvement comprising:
means in each channel of said system for detecting infrared radiation of a scanned object, said detecting means including an AC coupled output stage providing output signals dependent on a speed of said scanning and on the temperature of objects in said object space;

means for normalizing signals received in each of said channels, said normalizing means comprising means for averaging the output signal of said detecting means in each of said channels to provide an average value in each of said channels, said normalizing means further comprising means for scaling an output signal of said detecting means in each of said channels by the corresponding average value;

means coupled to said scaling means for adaptively enhancing said signals received in each of said channels; and means coupled to said normalizing means and to said enhancing means for displaying an image of said object in space.

* * * * *